US012249225B2

(12) United States Patent
Forster

(10) Patent No.: US 12,249,225 B2
(45) Date of Patent: *Mar. 11, 2025

(54) RANGE DISCRIMINATION IN AN RFID ELECTRONIC ARTICLE SURVEILLANCE SYSTEM

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/904,825

(22) PCT Filed: Feb. 25, 2021

(86) PCT No.: PCT/US2021/019528

§ 371 (c)(1),
(2) Date: Aug. 23, 2022

(87) PCT Pub. No.: WO2021/173752

PCT Pub. Date: Sep. 2, 2021

(65) Prior Publication Data

US 2023/0154300 A1 May 18, 2023

Related U.S. Application Data

(60) Provisional application No. 62/981,206, filed on Feb. 25, 2020.

(51) Int. Cl.
*G08B 13/24* (2006.01)

(52) U.S. Cl.
CPC ..... *G08B 13/2417* (2013.01); *G08B 13/2471* (2013.01); *G08B 13/2474* (2013.01)

(58) Field of Classification Search
CPC ............ G08B 13/2471; G08B 13/2417; G06K 7/10475; G06K 7/10356
See application file for complete search history.

(56) References Cited

U.S. PATENT DOCUMENTS 8,659,430 B2 2/2014 Bloy et al.
9,443,407 B2 9/2016 Davidson
(Continued)

FOREIGN PATENT DOCUMENTS

CN 101349745 1/2009
CN 109031191 12/2018
(Continued)

OTHER PUBLICATIONS

International Search Report and Written Opinion dated Jun. 11, 2021 issued in corresponding IA No. PCT/US2021/019528, filed Feb. 25, 2021.

(Continued)

*Primary Examiner* — Mirza F Alam

(57) ABSTRACT

RFID-based electronic surveillance article systems are provided with first and second receiving antennas. An RF signal is transmitted to an RFID device, which transmits a return signal that is received by the receiving antennas. A position of the RFID device may be determined based on a difference between the strength of the return signal when received by the first antenna and the strength of the return signal when received by the second antenna. If RF signals are transmitted by the receiving antennas, the position of the RFID device may be determined by changing the strengths of the RF signals transmitted by each antenna and comparing the strength of the RF signal transmitted by the first antenna when the RFID device is at a threshold for receiving the signal to the strength of the RF signal transmitted by the second antenna when the RFID device is at the threshold.

15 Claims, 2 Drawing Sheets

(56) References Cited

U.S. PATENT DOCUMENTS

| | | | | |
|---|---|---|---|---|
| 9,722,715 | B2 | 8/2017 | Nair | |
| 10,509,115 | B2 | 12/2019 | Morinaga | |
| 10,572,703 | B1 | 2/2020 | Shyamkumar et al. | |
| 10,592,182 | B2 | 3/2020 | Yoshida | |
| 10,657,340 | B2 | 5/2020 | Trivelpiece et al. | |
| 2012/0044074 | A1* | 2/2012 | Mulla | G08B 13/2448<br>340/572.1 |
| 2014/0179338 | A1 | 6/2014 | Shang et al. | |
| 2014/0361078 | A1* | 12/2014 | Davidson | G06K 7/10475<br>29/601 |
| 2019/0236323 | A1* | 8/2019 | Trivelpiece | G06Q 10/087 |
| 2020/0013270 | A1* | 1/2020 | Gundlach | G08B 21/0275 |

FOREIGN PATENT DOCUMENTS

| | | | | |
|---|---|---|---|---|
| EP | 2609580 B1 * | 3/2018 | | G01S 13/04 |
| JP | 2005-196264 | 7/2005 | | |
| JP | 2010-218280 | 9/2010 | | |
| JP | 2013-044169 | 3/2013 | | |
| JP | 2014-206496 | 10/2014 | | |
| JP | 2018-179919 | 11/2018 | | |
| JP | 2019-077085 | 5/2019 | | |
| JP | 2020-016458 | 1/2020 | | |
| WO | 2013/126391 | 8/2013 | | |
| WO | 2014/053746 | 4/2014 | | |

OTHER PUBLICATIONS

International Preliminary Report on Patentability dated Aug. 30, 2022 issued in corresponding IA No. PCT/US2021/019528 filed Feb. 25, 2021.

* cited by examiner

RANGE DISCRIMINATION IN AN RFID ELECTRONIC ARTICLE SURVEILLANCE SYSTEM

CROSS-REFERENCE TO RELATED APPLICATION

The present application is a 371 of International Application No. PCT/US2021/019528, which was published in English on Sep. 2, 2021, and claims the benefit of U.S. Provisional Patent Application No. 62/981,206 filed Feb. 25, 2020, both of which are incorporated herein by reference in their entireties.

FIELD

The present subject matter relates to radio frequency identification ("RFID") devices. More particularly, the present subject matter relates to determining the position of an RFID device in an electronic article surveillance ("EAS") system.

BACKGROUND

In retail stores, an accurate count of the products on display and/or in storage is important. Additionally, it is important to have an effective anti-theft system in place. RFID tags and labels (which may be collectively referred to herein as "RFID devices") have been employed to perform both of these functions.

An EAS system employing RFID technology has two primary read zones 10 and 12, as shown in FIG. 1, each of which includes an associated RFID reader. The first read zone 10 is an area in the store where the products are presented to the consumer (which may be referred to herein as "inventory zone"), while the second read zone 12 is an area at the exit of the store where any RFID devices that have not been suitably deactivated may be detected (which may be referred to herein as a "detection zone") to trigger some type of alarm, indicating that an attempt is being made to steal an item or items. When a customer properly purchases an item, the cashier either removes or deactivates the RFID device associated with it. If the RFID device is not removed or deactivated, an RFID reader or readers will read the device and cause an alarm or other alert to trigger in the detection zone 12.

Although the above-described systems are widespread, there are certain disadvantages. When using RFID devices/systems for an EAS system, one common problem is that the read range of an RFID device in certain circumstances can be large enough that an RFID device in the inventory zone 10 can be read in the detection zone 12 or vice versa. To reduce this risk, a transition zone 14 is frequently provided between the inventory zone 10 and the detection zone 12 to physically separate the two read zones. However, on account of different RFID devices having greater sensitivity at an operating frequency and/or different articles having different effects on the performance of the associated RFID devices, it is necessary for the transition zone 14 to be relatively large. The larger the transition zone the smaller the inventory zone and therefore the less merchandise the retailer can present to customers for purchase. It would, thus, be advantageous to provide RFID devices that are configured in a way that allows for the size of the transition zone 14 to be reduced.

In a number of RFID-based EAS systems, an attempt is made to discriminate the range between the RFID device and the EAS reader system by measuring such factors as (when the reader system is transmitting at constant power) when the RFID device starts responding and the level of the response, which is commonly referred to as Received Signal Strength Indication (RSSI). However, the results of such an approach may be unreliable due to an attenuation factor K and RFID device sensitivity T. K and T can be affected by environmental conditions, such as reflections and absorbing materials between an RFID device and the reader system, as well a loss caused by attempts to steal objects where a thief may place the RFID device close to a human body to attenuate the signals (referred to the human body model or human body effect). A high T and low K can make a distant RFID device (e.g., one in the inventory zone) respond at similar levels to a tag in the EAS zone and cause false alarms. It will be appreciated that an RFID reader transmitting at maximum power is ideal for detection when K is high, due to deliberate attempts to defeat the EAS system, but this also increases the probability of false alarms. Therefore, a method of discrimination that is independent of K would be advantageous.

SUMMARY

There are several aspects of the present subject matter which may be embodied separately or together in the devices, systems, and methods described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Methods for determining a position of an RFID device in an electronic article surveillance system having first and second read zones are described herein. The method includes transmitting an RF signal to an RFID device and receiving a return signal from the RFID device at a first location and at a second location. The difference between a first strength of the return signal at the first location and a second strength of the return signal at the second location is computed and it is determined whether the RFID device is positioned in the first read zone based at least in part on the difference between the first and second strengths.

Electronic article surveillance systems for determining a position of an RFID device configured to transmit a return signal upon receiving an RF signal are also described herein. In some embodiments, the electronic surveillance system includes first and second read zones, first and second receiving antennas, and a controller. In some embodiments, the first receiving antenna is configured to receive a return signal at a first strength, while the second receiving antenna is configured to receive the return signal at a second strength. The controller is configured to determine whether the RFID device is positioned in the first read zone based at least in part on the difference between the first and second strengths.

Methods for determining a position of an RFID device in an electronic article surveillance system having first and second read zones are described herein. In some embodiments, the method includes transmitting a first RF signal to an RFID device from a first location and changing the power of the first RF signal to a first power corresponding to a threshold at which a first return signal from the RFID device is received at the first location. A second RF signal is transmitted to the RFID device from a second location, with the power of the second RF signal being changed to a second power corresponding to a threshold at which a second return signal from the RFID device is received at the second location. The difference between the first strength and the second strength is determined, with it then being determined whether the RFID device is positioned in the first read zone based at least in part on the difference between the first and second strengths.

Electronic article surveillance systems for determining a position of an RFID device configured to transmit return signals upon receiving RF signals are also described herein. In some embodiments, the electronic surveillance system includes first and second read zones, first and second receiving antennas, and a controller. The first receiving antenna is configured to transmit a first RF signal to the RFID device and to change the power of the first RF signal to a first power corresponding to a threshold at which a first return signal from the RFID device is received by the first receiving antenna. The second receiving antenna is configured to transmit a second RF signal to the RFID device and to change the power of the second RF signal to a second power corresponding to a threshold at which a second return signal from the RFID device is received by the second receiving antenna. The controller is configured to determine whether the RFID device is positioned in the first read zone based at least in part on the difference between the first and second strengths.

DETAILED DESCRIPTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
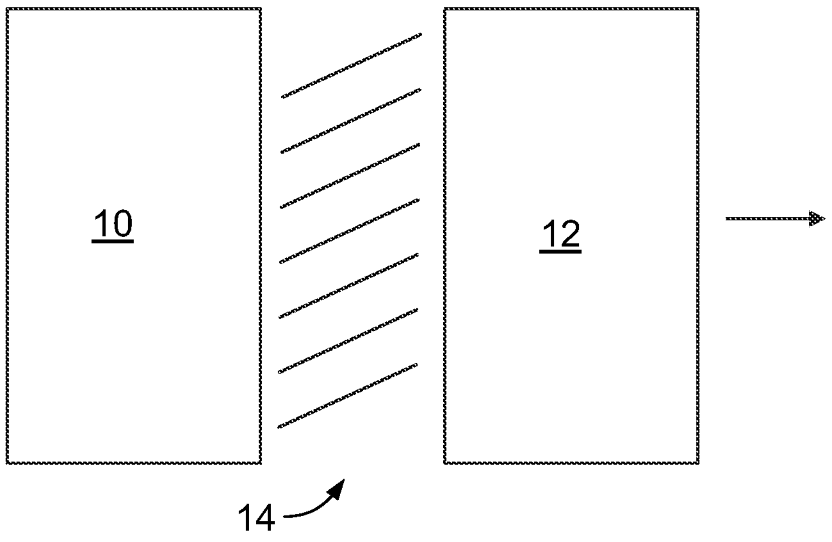
FIG. 1 PRIOR ART
FIG. 1 is a schematic view of a conventional EAS system using RFID devices.
Figure 2:
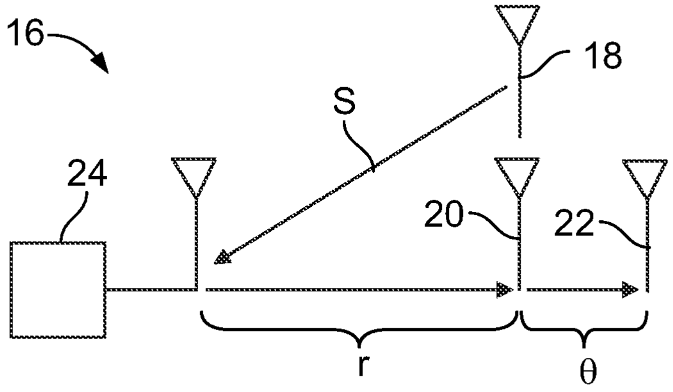
FIG. 2 is a schematic view of an exemplary embodiment of an RFID-based EAS system according to the present disclosure.

FIG. 2 illustrates an exemplary embodiment of an RFID-based EAS system 16 according to the present disclosure. In the embodiment of FIG. 2, an EAS system 16 includes a transmitting antenna 18 and two receiving antennas 20 and 22. The antennas of an EAS system according to the present disclosure may be variously configured without departing from the scope of the present disclosure, though it may be preferable to employ antenna designs that have either equal gain in the zone of interest or a means for compensating for the values of RSSI/power measured. By way of example, the receiving antennas 20 and 22 of FIG. 2 may be configured as dipole antennas, directional antennas, transmission line antennas, or combinations thereof. Differently configured antennas will have different performance characteristics and, thus, different advantages. Dipole antennas, for example, will give good angular coverage for an EAS system configured to detect the two-dimensional position of an RFID device. Directional antennas, on the other hand, are better configured for keeping the detection zone for a gate of an EAS system focused forward. Accordingly, it should be understood that the present disclosure is not limited to EAS systems having particularly configured antennas, but rather that the aspects described herein may be practiced using a variety of differently configured antennas.

In the EAS system 16 of FIG. 2, the transmitting antenna 18 transmits an RF signal "S" to an RFID device 24 (e.g., an RFID tag or label attached to a piece of merchandise) positioned somewhere in the EAS system 16. The RFID device 24 receives the RF signal S from the transmitting antenna 18 and returns a return signal, which is received by the first receiving antenna 20 and the second receiving antenna 22.

On account of environmental conditions, the strength of the return signal will decrease as the distance traveled by the return signal increases. In the orientation of FIG. 2, the first receiving antenna 20 is positioned closer to the RFID device 24 than the second receiving antenna 22, such that the strength or RSSI of the return signal will be greater at the first receiving antenna 20 than at the second receiving antenna 22. In FIG. 2, the distance between the RFID device 24 and the first receiving antenna 20 is represented by "r" and the distance between the first and second receiving antennas 20 and 22 is represented by "θ", such that the distance between the RFID device 24 and the second receiving antenna 22 is r+θ.

As described above, measuring the strength or RSSI of the return signal from an RFID device using a single antenna may not be particularly informative or useful. However, by comparing the strength or RSSI of a return signal using two antennas 20 and 22 positioned a known distance away from each other, it is possible to more reliably determine the approximate position of an RFID device 24 in an EAS system 16. As described above, the strength or RSSI of a return signal is a function of the distance traveled by the return signal. The common distance traveled by the return signal in reaching the first and second receiving antennas 20 and 22 (which is represented in FIG. 2 by "r") may be canceled out when comparing the strength or RSSI of the return signal received by the first and second receiving antennas 20 and 22. Thus, the difference between the strength or RSSI of the return signal received by the first receiving antenna 20 and the second receiving antenna 22 will be indicative of the loss of strength as the return signal travels the known distance θ between the first and second receiving antennas 20 and 22.

The change in strength or RSSI of an RF signal obeys a square law, such that the difference in strength or RSSI of the return signal received by the first receiving antenna 20 and the second receiving antenna 22 will be indicative of the distance r between the RFID device 24 and the first receiving antenna 20. Generally speaking, the difference between the strength or RSSI of the return signal received by the first receiving antenna 20 and the second receiving antenna 22 will be relatively large in magnitude when the distance r is relatively small, while the difference will be relatively small in magnitude when the distance r is relatively large. The exact magnitude of the difference will depend on a number of factors, but in an exemplary embodiment the magnitude of the difference will be on the order of approximately 6 dB when r=1, on the order of approximately 1.6 dB when r=5, and on the order of approximately 0.83 dB when r=10.

Regardless of the particular difference between the return signal strength or RSSI at the two receiving antennas 20 and 22, it will be seen that any RFID device 24 that does not show a significant change in strength or RSSI can be considered to be a significant distance away from the receiving antennas 20 and 22. While the illustrative example is not highly accurate at long distances (e.g., the difference in signal strength or RSSI is minor at r=5 and r=10), the EAS system 16 may be configured so as to not need high accuracy at relatively long ranges. For example, in one embodiment, the two receiving antennas 20 and 22 (or a single antenna with more than one reference plane, in the case of the receiving antennas being incorporated into a transmission line antenna) are placed between the inventory zone 10 and the detection zone 12, with the first receiving antenna 20 positioned closer to the inventory zone 10 than the second receiving antenna 22. When an RFID device 24 is positioned closer to the inventory zone 10 than to the detection zone 12 (i.e., closer to the first receiving antenna 20 than to the second receiving antenna 22), the difference between the strength or RSSI of the return signal received by the first receiving antenna 20 and the second receiving antenna 22 should be positive (i.e., the return signal should be stronger at the first receiving antenna 20 than at the second receiving antenna 22).

Thus, in this illustrative configuration, a difference in strength or RSSI of the return signal received by the first receiving antenna 20 and the second receiving antenna 22 that is positive and relatively small (i.e., less than a positive threshold value, which value is somewhere between 1.6 dB and 6 dB in the exemplary embodiment) will be sufficient to indicate that the RFID device 24 is positioned somewhere in the inventory zone 10. The exact location of the RFID device 24 within the inventory zone (e.g., whether r=5 or r=10) may not be accurately determinable, but it is sufficient just to know that the RFID device 24 is in the inventory zone 10, rather than in the detection zone 12 or the transition zone 14. The exact positive threshold value for determining whether or not an RFID device 24 is sufficiently far away from the receiving antennas 20 and 22 will depend on a number of factors (e.g., the positions of the receiving antennas 20 and 22 within the EAS system 16 and the size of the transition zone 14), so the present disclosure is not limited to any particular positive threshold value.

Similarly, to determining that an RFID device 24 is somewhere in the inventory zone 10, an EAS system 16 according to the present disclosure may also determine when an RFID device 24 is somewhere in the detection zone 12. When the first receiving antenna 20 is positioned closer to the inventory zone 10 than the second receiving antenna 22, and when an RFID device 24 is positioned closer to the detection zone 12 than to the inventory zone 10, the difference between the strength or RSSI of the return signal received by the first receiving antenna 20 and the second receiving antenna 22 should be negative. Thus, in this illustrative configuration, a difference in strength or RSSI of the return signal received by the first receiving antenna 20 and the second receiving antenna 22 that is negative and relatively small (i.e., greater or closer to zero than a negative threshold value) will be sufficient to indicate that the RFID device 24 is positioned somewhere in the detection zone 12. The exact negative threshold value for determining whether or not an RFID device 24 is sufficiently far away from the receiving antennas 20 and 22 will depend on a number of factors (e.g., the positions of the receiving antennas 20 and 22 within the EAS system 16 and the size of the transition zone 14), so the present disclosure is not limited to any particular negative threshold value.

Figure 3:
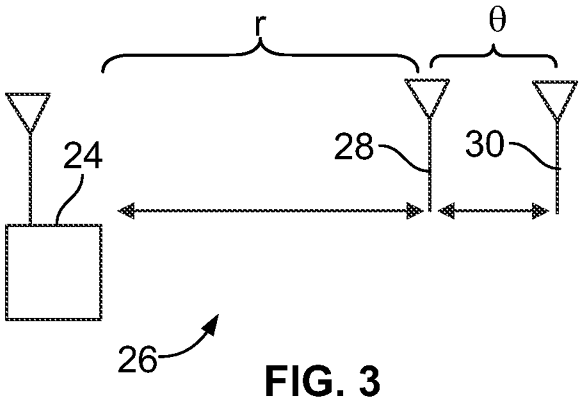
FIG. 3 is a schematic view of another exemplary embodiment of an RFID-based EAS system according to the present disclosure.

It should be understood that the configuration of FIG. 2 is merely exemplary and that EAS systems according to the present disclosure may be differently configured. For example, FIG. 3 illustrates an EAS system 26 in which RF signals are transmitted by two receiving antennas 28 and 30, rather than by a third, transmitting antenna (as in FIG. 2). The EAS system 26 of FIG. 3 may be referred to as operating in a "mono-static" mode, while the EAS system 16 of FIG. 2 may be referred to as operating in a "bi-static" mode.

In the embodiment of FIG. 3, each receiving antenna 28, 30 transmits an RF signal to an RFID device 24 and receives a return signal. As in the embodiment of FIG. 2, the difference in the strength or RSSI of the return signal received by the first receiving antenna 28 and the second receiving antenna 30 may be used to determine the general position of the RFID device 24 (i.e., whether the RFID device 24 is located somewhere in the inventory zone 10 or somewhere in the detection zone 12). However, as two different RF signals are being sent to the RFID device 24 in the EAS system of FIG. 3, care must be taken to ensure that the return signals from the RFID device 24 are transmitted at the same power. The power of the return signal transmitted by the RFID device 24 upon receiving RF signals from the first and second receiving antennas 28 and 30 will be the same when the RFID device 24 receives just enough power to transmit a return signal (which is referred to herein as the "threshold"), which represents a constant power in and a constant power out.

In one embodiment, each receiving antenna 28, 30 will begin by transmitting a low-strength RF signal and then increasing the strength of the RF signal until first receiving a return signal from the RFID device 24, which will be the strength of the RF signal of that receiving antenna at the threshold of the RFID device 24. Alternatively, rather than starting at a low power, the threshold may be reached by the receiving antennas 28 and 30 initially transmitting a higher power RF signal that is sufficiently strong to reach the RFID device 24, with the power being lowered until a return signal is no longer transmitted. Indeed, it should be understood that the threshold can reached using any of a number of suitable approaches, which can include a linear sweep or a binary search.

Just as the difference in the strength between two return signals may be used to determine the general location of the RFID device 24, the difference in strength between the RF signal emitted by the first receiving antenna 28 at the threshold of the RFID device 24 and the RF signal emitted by the second receiving antenna 30 at the threshold of the RFID device 24 may be indicative of the general location of the RFID device 24. The RF signals emitted by the two receiving antennas 28 and 30 will have the same (or at least substantially the same) strength or RSSI when reaching the RFID device 24. The two RF signals will traverse the same distance r in reaching the RFID device 24, such that the additional strength required to bring the RFID device 24 to threshold by the farther receiving antenna (which is the second receiving antenna 30 in the orientation of FIG. 3, but may be the first receiving antenna 28, depending on the location of the RFID device 24) is entirely due to the losses associated with the distance θ between the receiving antennas 28 and 30. This information may be used (by employing the principles described herein) to determine whether the RFID device 24 is a substantial distance away from the receiving antennas 28 and 30, with a positive or negative difference indicating the side of the receiving antennas 28 and 30 on which the RFID device 24 is positioned.

For optimum performance, it is preferred for an RFID device 24 to have no changes or only relatively small changes in its position during the above-described measurements. A bi-static system may be advantageous in this regard, as it is only required that the power of the RF signal transmitted by the transmitting antenna 18 is sufficient to elicit a response from the RFID device 24, whereas a mono-static system must adjust power transmitted to keep a particular RFID device 24 at threshold, which is slower. However, a mono-static system allows for a second approach to determining the general location of an RFID device 24, which may be preferred in certain circumstances.

While an EAS system according to the present disclosure may be configured to be less accurate at longer ranges, it may be advantageous for the EAS system to be more accurate for monitoring movement of an RFID device from the transition zone 14 to the detection zone 12 to prevent false alarms. The determination of the movement of an RFID device may be based upon a comparison of the approximate location of the RFID device at a first time to the approximate location of the RFID device at a later second time. In one exemplary embodiment, an EAS system of the type described above may employed to determine the general position of an RFID device 24 at a first time, based on the difference in strength or RSSI between return signals received by two receiving antennas (as in the embodiments of FIGS. 2 and 3) or the difference in power of RF signals emitted by two receiving antennas in bringing the RFID device 24 to threshold (as in the embodiment of FIG. 3). The same approach may be used to determine the general position of the same RFID device 24 at a second time, with the difference between the general positions at the first and second times being indicative of the direction in which the RFID device 24 is moving.

Figure 4:
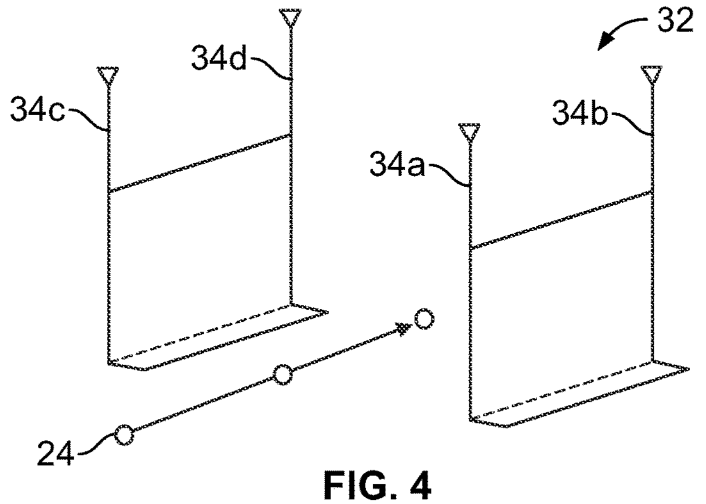
FIG. 4 is a schematic view of an exemplary arrangement of antennas of a gate of an EAS system according to an aspect of the present disclosure.
Figure 5:
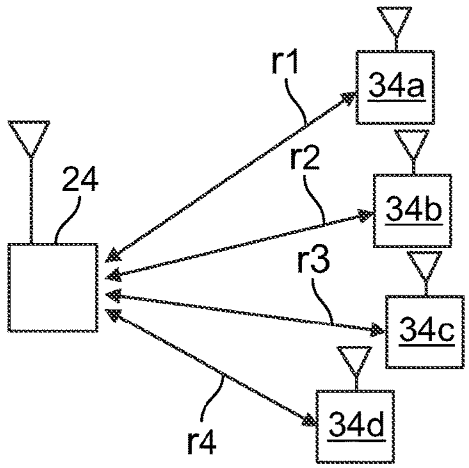
FIG. 5 is a schematic view of an EAS system of the present disclosure being used to determine the two-dimensional location of an RFID device.

While the EAS systems 16 and 26 of FIGS. 2 and 3 may be used to determine the general position and movement of an RFID device 24, an EAS system having more receiving antennas will be able to more accurately determine the position and, thus, movement of an RFID device 24. FIG. 4 illustrates an exemplary gate 32 of an EAS system having four receiving antennas 34*a*-34*d*, while FIG. 5 illustrates an exemplary approach to determining the position of an RFID device 24 using a system of the type shown in FIG. 4. It should be understood that an EAS system may have more than four receiving antennas and that such antennas may be variously positioned (including at different elevations, such as one or more antennas associated with a ceiling and others positioned at ground level) without departing from the scope of the present disclosure.

Regardless of the exact number and position of the receiving antennas of an EAS system, each receiving antenna has a known position within the EAS system and a known position with respect to the other receiving antennas. The approximate distance r1-r4 between the RFID device 24 and each receiving antenna 34 (FIG. 5) may be determined based on the strength or RSSI of a return signal received by each receiving antenna 34 or (in the case of receiving antennas configured to also transmit RF signals to the RFID device 24) the strength of the RF signal transmitted by each receiving antenna 34 in bringing the RFID device 24 to its threshold. By simultaneously solving differential values, the absolute and relative positions of the receiving antennas 34*a*-34*d* and the distances r1-r4 between the RFID device 24 and the receiving antennas 34*a*-34*d* may be used to determine the two-dimensional position of the RFID device 24 (i.e., by triangulation).

After the two-dimensional position of an RFID device 24 has been determined at a first time, the process may be repeated at a later second time to determine the two-dimensional position of the RFID device 24 at the second time. The positions of the RFID device 24 at the two times may be compared to determine the direction of movement of the RFID device through the EAS system. As described above, this may be particularly relevant for determining when an RFID device 24 is moving through the transition zone 14 and toward the detection zone 12, which may be indicative of an attempt to steal a piece of merchandise associated with the RFID device 24. The two-dimensional position of the RFID device 24 may be determined at several times to more accurately and particularly trace the path of the RFID device 24 through the EAS system. It may be the case that the receiving antennas 34 are able to more accurately determine the position of an RFID device 24 at close range, in which case it may be advantageous for the receiving antennas 34 to be positioned adjacent to the detection zone 12 to track movement of RFID devices through the transition zone 14 and toward the detection zone 12.

Figure 6A:
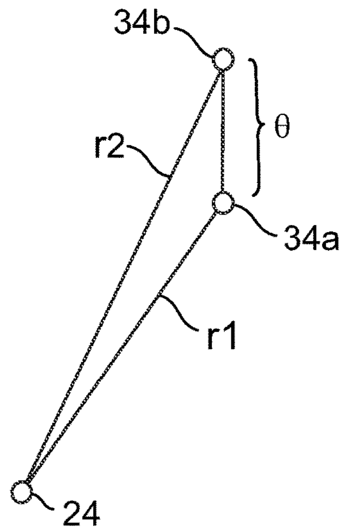
FIGS. 6A-6C illustrate an approach to determining movement of an RFID device using an EAS system according to the present disclosure.
Figure 6B:
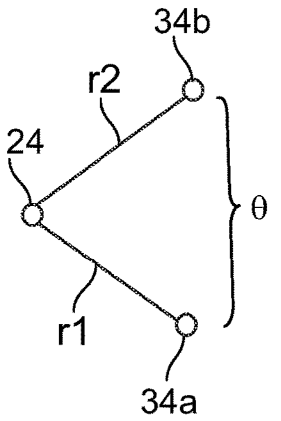
Figure 6C:
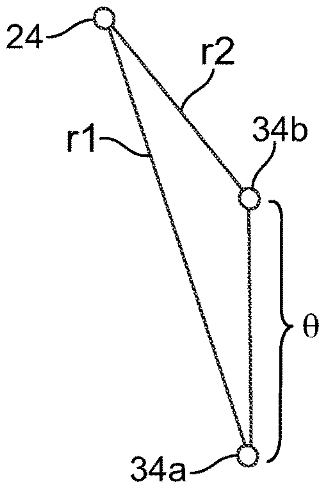

FIG. 6A-6C illustrate movement of an RFID device 24 through the gate 32 of FIG. 4, from a first position on one side of the gate 32 (FIG. 6A) to a second position at the gate 32 (FIG. 6B) to a third position on the opposite side of the gate 32 (FIG. 6C). In FIGS. 6A-6C, the RFID device 24 is being monitored by two of the receiving antennas 34*a* and 34*b* of the gate 32. The two receiving antennas 34*a* and 34*b* are separated by a distance θ (as in FIGS. 2 and 3). When the RFID device 24 is a distance of more than four times greater than θ ($r>4\times\theta$) away from the gate 32 (as in FIG. 6A), and the RFID device 24 is moving toward the gate 32, the angular difference between a direct line between the first receiving antenna 34*a* and the RFID device 24 (represented in FIG. 6A by r1) and a direct line between the second receiving antenna 34*b* and the RFID device 24 (represented in FIG. 6A by r2) is small, so the vector distance can be considered largely the separation θ of the two receiving antennas 34*a* and 34*b*. This is similar to the arrangements shown in FIGS. 2 and 3, in which two antennas are treated or assumed to be aligned with an RFID device 24.

As the range drops (i.e., as the RFID device 24 moves closer to the gate 32), the difference between the vector distance between the first receiving antenna 34*a* and the second receiving antenna 34*b* drops, so the range estimate (and the combined RSSI or strength of the return signals received by the receiving antennas 34*a* and 34*b*) then starts to increase. When the RFID device 24 is exactly the same distance from the first and second receiving antennas 34*a* and 34*b* (as in FIG. 6B), the estimated range is essentially infinite. When the RFID device 24 transits through the gate 32, the range estimate (and the combined RSSI or strength of the return signals received by the receiving by the receiving antennas 34*a* and 34*b*) then starts to decrease again, but showing the opposite direction, until the RFID device 24 is again a distance of more than four times greater than θ ($r>4\times\theta$) away from the gate 32 (as in FIG. 6C), at which time the range increases, giving a more accurate measurement of the range. This transit shape is characteristic of transiting the gate 32 and can be analyzed by looking at the differential of the calculated range change over time and the tendency of the combined RSSI to peak in the center of the gate 32 (FIG. 6B)

In FIGS. 6A-6C, only one pair of receiving antennas 34*a* and 34*b* of the gate 32 of FIG. 4 is illustrated as being used to track movement of an RFID device 24. If a plurality of gates or pairs of receiving antennas are provided (as in FIG. 4), a system controller may select the most appropriate pair of receiving antennas to monitor movement of an RFID device 24. The most accurate estimate of range is the minimum value from any pair of receiving antennas (e.g., either receiving antennas 34*a* and 34*b* or receiving antennas 34*c* and 34*d* in FIG. 4), representing an RFID device 24 being most closely aligned with that pair of receiving antennas.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A method of determining a position of an RFID device in an electronic article surveillance system having first and second read zones, comprising:

transmitting an RF signal to an RFID device;

receiving a return signal from the RFID device at a first location and at a second location;

calculating the difference between a first strength of the return signal at the first location and a second strength of the return signal at the second location;

determining whether the RFID device is positioned in the first read zone based at least in part on the difference between the first and second strengths, wherein said determining whether the RFID device is positioned in the first read zone is based on the difference between the first and second strengths is based on signal loss occurring between the first and second locations and is independent of signal loss occurring between the RFID device and whichever of the first and second locations is closer to the RFID device;

determining an approximate two-dimensional position of the RFID device based at least in part on the difference between the first and second strengths, sequentially transmitting a plurality of RF signals to the RFID device via a transmitting antenna, receiving sequentially transmitted return signal from the RFID device via the first and second receiving antennas;

calculating the approximate two-dimensional position of the RFID device for each RF signal; and determining a direction of movement of the RFID device based at least in part on the two-dimensional position of the RFID device for each RF signal.

2. The method of claim 1, wherein the second location is positioned farther from the first read zone than the first location, and it is determined that the RFID device is positioned in the first read zone when the difference between the first and second strengths is positive and less than a positive threshold value.

3. The method of claim 1, wherein the second location is positioned farther from the first read zone than the first location, and it is determined that the RFID device is positioned in the second read zone when the difference between the first and second strengths is greater than a negative threshold value.

4. The method of claim 1, wherein the RF signal is transmitted from a location different from the first and second locations.

5. The method of claim 1, wherein said transmitting an RF signal to the RFID device includes transmitting a first RF signal from the first location and a second RF signal from the second location.

6. An electronic article surveillance system for determining a position of an RFID device configured to transmit a return signal upon receiving an RF signal, the electronic surveillance system comprising:

a first read zone;

a second read zone;

a transmitting antenna configured to sequentially transmit a plurality of RF signals to the RFID device;

a first receiving antenna configured to receive the return signal at a first strength;

a second receiving antenna configured to receive the return signal at a second strength;

wherein the first and second receiving antennas are configured to receive sequentially transmitted return signal from the RFID device; and a controller configured to:

determine whether the RFID device is positioned in the first read zone based at least in part on a difference between the first and second strengths, wherein said determining whether the RFID device is positioned in the first read zone based on the difference between the first and second strengths is based on the difference between the first and second strengths is based on signal loss occurring between the first and second locations and is independent of signal loss occurring between the RFID device and whichever of the first and second locations is closer to the RFID device, determine an approximate two-dimensional position of the RFID device based at least in part on the difference between the first and second strengths, and determine the approximate two-dimensional position of the RFID device for each return signal, and to determine a direction of movement of the RFID device based at least in part on the two-dimensional position of the RFID device for each return signal.

7. The electronic article surveillance system of claim 6, wherein the second location is positioned farther from the first read zone than the first location, and the controller is configured to determine that the RFID device is positioned in the first read zone when the difference between the first and second strengths is positive and less than a positive threshold value.

8. The electronic article surveillance system of claim 6, wherein the second location is positioned farther from the first read zone than the first location, and the controller is configured to determine that the RFID device is positioned in the second read zone when the difference between the first and second strengths is greater than a negative threshold value.

9. The electronic article surveillance system of claim 6, further comprising a transmitting antenna configured to transmit said RF signal.

10. The electronic article surveillance system of claim 6, wherein the first receiving antenna is configured to transmit a first RF signal, and the second receiving antenna is configured to transmit a second RF signal.

11. The electronic article surveillance system of claim 6, wherein at least one of the first and second receiving antennas comprises a dipole antenna.

12. The electronic article surveillance system of claim 6, wherein at least one of the first and second receiving antennas comprises a directional antenna.

13. The electronic article surveillance system of claim 6, wherein at least one of the first and second receiving antennas comprises a transmission line antenna.

14. A method of determining a position of an RFID device in an electronic article surveillance system having first and second read zones, comprising:

transmitting a first RF signal to an RFID device from a first location and changing a power of the first RF signal to a first power corresponding to a threshold at which a first return signal from the RFID device is received at the first location;

transmitting a second RF signal to the RFID device from a second location and changing a power of the second RF signal to a second power corresponding to a threshold at which a second return signal from the RFID device is received at the second location;

calculating the difference between the first strength and the second strength; and determining whether the RFID device is positioned in the first read zone based at least in part on the difference between the first and second strengths, wherein said determining whether the RFID device is positioned in the first read zone based on the difference between the first and second strengths is based on signal loss occurring between the first and second locations and is independent of signal loss occurring between the RFID device and whichever of the first and second locations is closer to the RFID device, determining an approximate two-dimensional position of the RFID device based at least in part on the difference between the first and second strengths;

sequentially transmitting a plurality of RF signals to the RFID device via a transmitting antenna;

receiving sequentially transmitted return signal from the RFID device via the first and second receiving antennas;

calculating the approximate two-dimensional position of the RFID device for each RF signal; and determining a direction of movement of the RFID device based at least in part on the two-dimensional position of the RFID device for each RF signal.

15. An electronic article surveillance system for determining a position of an RFID device configured to transmit return signals upon receiving RF signals, the electronic surveillance system comprising:

a first read zone;

a second read zone;

a transmitting antenna configured to sequentially transmit a plurality of RF signals to the RFID device;

a first receiving antenna configured to transmit a first RF signal to the RFID device and to change a power of the first RF signal to a first power corresponding to a threshold at which a first return signal from the RFID device is received by the first receiving antenna;

a second receiving antenna configured to transmit a second RF signal to the RFID device and to change a power of the second RF signal to a second power corresponding to a threshold at which a second return signal from the RFID device is received by the second receiving antenna, wherein the first and second receiving antennas are configured to receive sequentially transmitted return signal from the RFID device; and a controller configured to:

determine whether the RFID device is positioned in the first read zone based at least in part on a difference between the first and second strengths, wherein said determining whether the RFID device is positioned in the first read zone based on the difference between the first and second strengths is based on signal loss occurring between the first and second locations and is independent of signal loss occurring between the RFID device and whichever of the first and second locations is closer to the RFID device determine an approximate two-dimensional position of the RFID device based at least in part on the difference between the first and second strengths, and determine the approximate two-dimensional position of the RFID device for each return signal, and to determine a direction of movement of the RFID device based at least in part on the two-dimensional position of the RFID device for each return signal.

* * * * *